Patented May 22, 1934

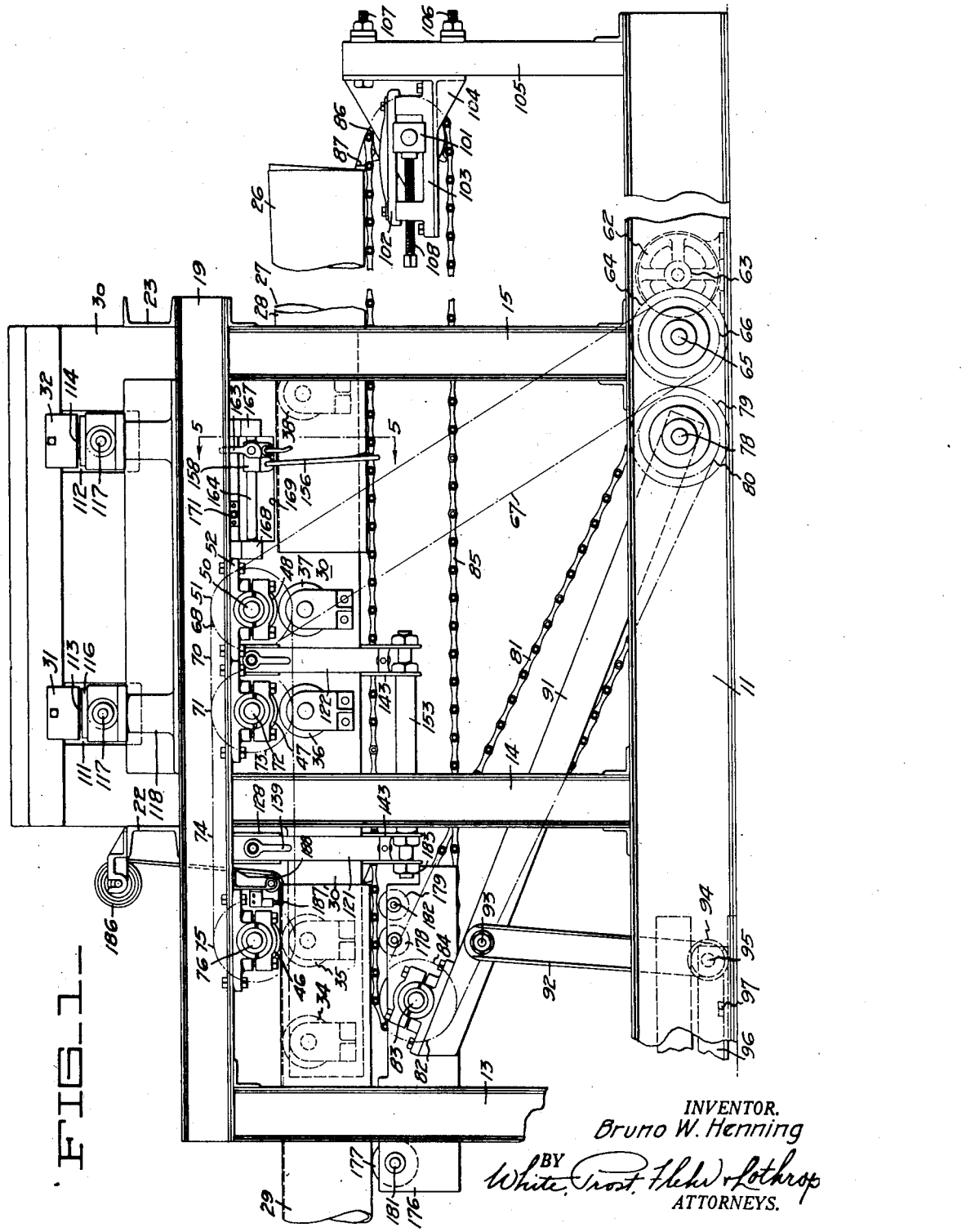

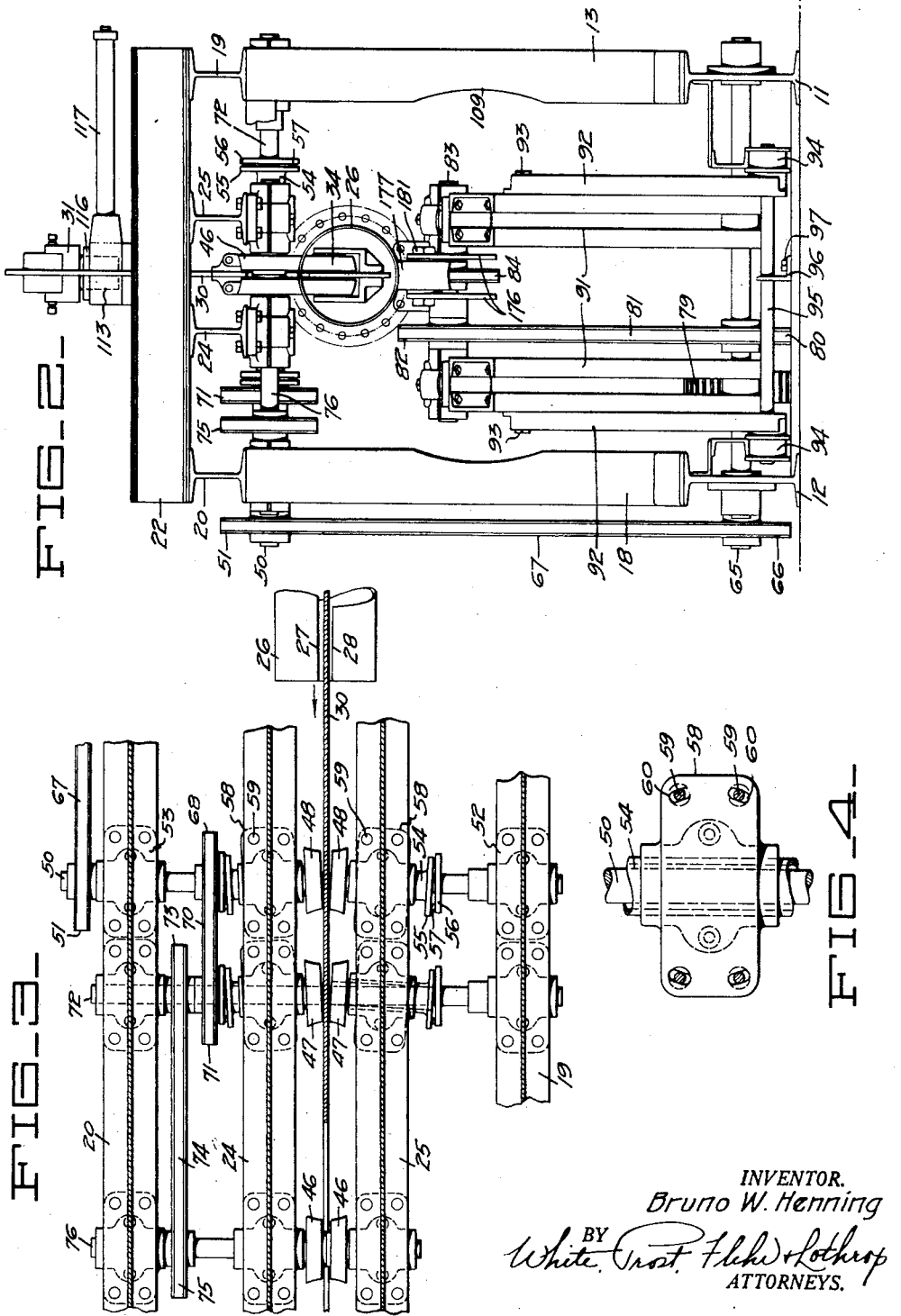

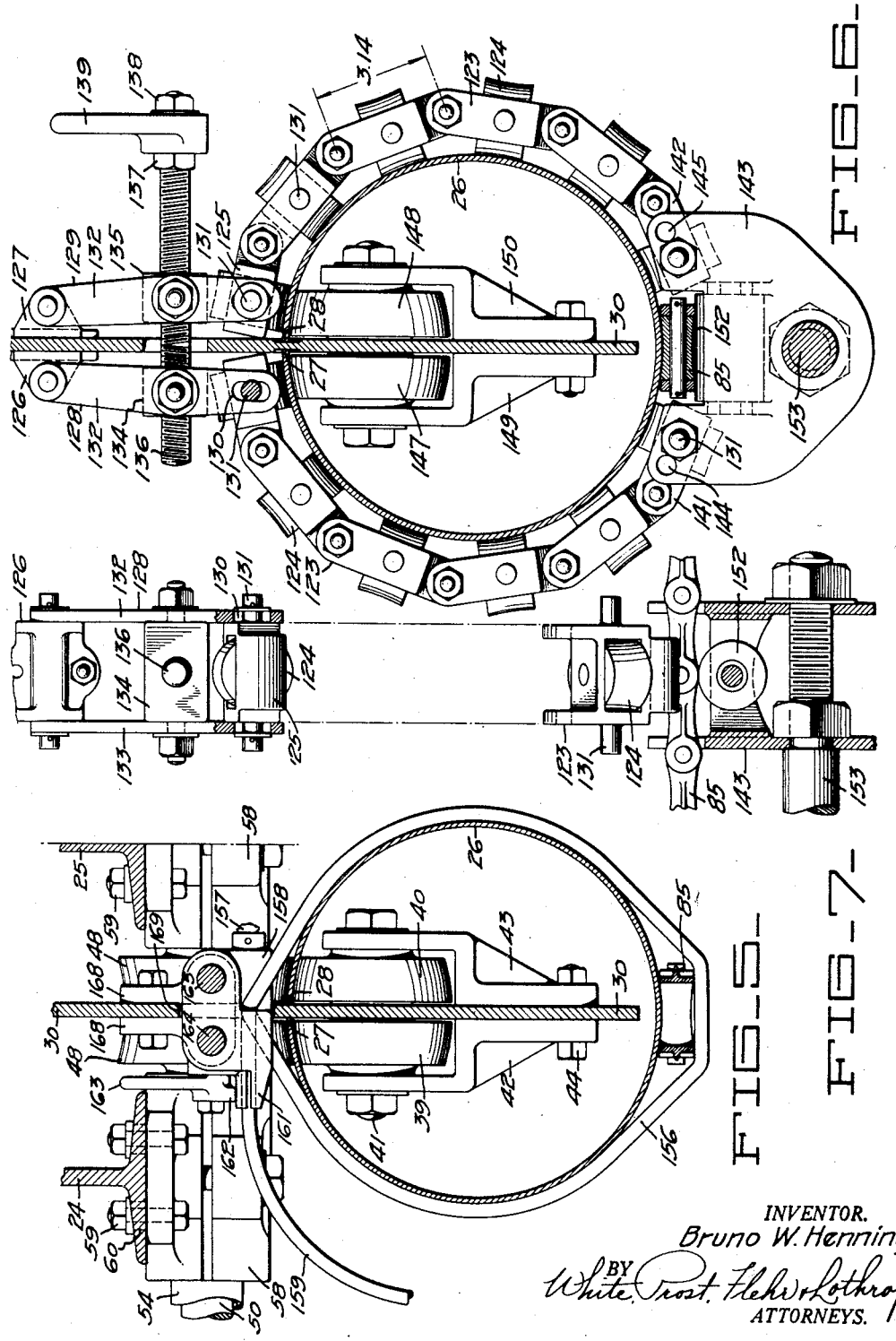

1,959,673

UNITED STATES PATENT OFFICE 1,959,673

APPARATUS FOR FORMING PIPE

Bruno W. Henning, San Francisco, Calif.

Application January 4, 1930, Serial No. 418,546

7 Claims. (Cl. 219—6)

This invention relates to a method of and apparatus for forming pipe and is especially suitable for forming pipes having welded seams. In forming a piece of sheet metal, preparatory to welding it into a pipe, it has been a common practice to shape the material manually into the general contour of a pipe having a longitudinal slit and to weld spots at spaced intervals along the slit to retain the shape until the actual welding of the slit is accomplished. That method possesses many serious disadvantages. Buckling of the pipe adjacent the slit while it is being welded, causes an uneven weld and consequently the joint is weaker in some parts than in others. The process was slow and tedious, due to the exacting nature of the work and to the difficulty in handling heavy and awkward material of this nature while parts of it are at welding temperatures.

In order to obtain a pipe having a more nearly circular cross section, it has been common to roll the edges of the sheet of metal to curve them before they are brought together, but the results obtained by this method are obviously only approximate and even then the variance from true circular form is not uniform. Buckling of the pipe causes some parts of the joint to be flatter than others, while still other parts are caused to protrude outwardly.

It is an object of this invention to devise a method for forming and welding pipe in a faster and more convenient manner.

Another object is to devise a method of welding pipe in which the welded joint is stronger, neater and more uniform.

Another object is to devise a method of welding pipe in which the cross section of the finished pipe is uniform and more nearly circular.

Another object is to devise a machine for facilitating the handling of a pipe preparatory to its being welded.

Still another object is to devise a machine for welding pipe which saves time, labor and expense.

Other objects and advantages will become apparent to those skilled in the art, as the detailed description of the invention proceeds.

Attention is directed to the accompanying drawings in which:

Fig. 1 is an elevation of a machine embodying the principles of this invention.

Fig. 2 is an end view of the machine shown in Fig. 1.

Fig. 3 is a plan view showing certain ones of the drive rollers of the machine of this invention.

Fig. 4 is a detail view of the bearing for one of the drive rollers shown in Fig. 3.

Fig. 5 is a cross section taken on line 5—5 of Fig. 1.

Fig. 6 is a detail view showing the linked roller die of this invention.

Fig. 7 is an end view of Fig. 6 with some of the links broken away.

Briefly, the invention is directed to a method and apparatus for welding pipe, in which a sheet of metal is first formed into approximate cylindrical shape with the edges of the sheet in abutting relation, conveying the sheet through a series of rollers to draw the edges closer together and also to curve the edges to conform to the circular cross section of the finished pipe and continuously welding the edges together at a definite welding angle which is maintained by the series of rollers while the pipe is being conveyed through them.

Referring to Figs. 1 and 2 of the drawings, a frame for the machine is shown comprising a pair of parallel base members 11 and 12, which may be in the form of I-beams as shown. Mounted on base members 11 and 12 are a plurality of upwardly extending columns such as the columns 13, 14, 15 and 18. A beam 19 is supported on columns 13, 14 and 15, and a parallel beam 20 is supported on similar columns of which 18 is one. A pair of channels 22 and 23 are mounted on and extend between beams 19 and 20 and suspended from channels 22 and 23 are beams 24 and 25.

A metal sheet 26 of general cylindrical form having a longitudinal slit is shown entering the machine and a finished pipe 29 is shown leaving the machine. Metal sheet 26 is delivered to the machine with its abutting edges 27 and 28 upward. Extending down through the slit formed by edges 27 and 28 and having a lateral portion 30' extending inside of the completed pipe 29, is a rugged sheet metal fin 30. Fin 30 is mounted on adjustable yoke-like supports 31 and 32 and is prevented from endwise movement by channels 22 and 23. Mounted on fin 30 and in a manner which enables them to pass within the cylindrical form 26 and inside of pipe 29 are a plurality of sets of internal rollers 34 to 38. A detail view of one of the sets of internal rollers is shown in Fig. 5. Each set comprises a pair of rollers 39 and 40 having convex rolling surfaces and mounted on a spindle 41 in brackets 42 and 43 secured to fin 30 by means of bolts 44. In co-acting relation with internal sets of rollers 35, 36 and 37 are complementary external rollers 46, 47 and 48, respectively, the rollers of each set having concave rolling surfaces and mounted in bearings secured to beams 24 and 25. In addition to shaping the contour of the pipe, these external rollers also serve to drive the pipe through the machine. Rollers 47 and 48 are mounted in such a manner that the rollers forming each set may be disposed at an angle to each other; this angle corresponding to the angle formed by the edges in sheet 26 as it passes beneath the rollers.

For driving rollers 48, a shaft 50 carrying a driven sprocket 51 is mounted in bearings 52 and 53 supported on beams 19 and 20 respectively, see Fig. 3 of the drawings. Each of the rollers 48 is rigidly mounted on one end of a hollow shaft 54 to rotate therewith, and on the other end of hollow shaft 54 is a plate 55, rigidly secured thereto and having holes therein to receive pins 57 secured to a plate 56 rigidly mounted on shaft 50. Shaft 50 extends through the hollow portion of shaft 54 and there is enough clearance between the outside diameter of shaft 50 and the inside diameter of shaft 54 to allow a limited disalignment of these two shafts. Each shaft 54 is journalled in a bearing 58, secured to beam 25 by means of bolts 59. Slots 60, provided for bolts 59, are of sufficient size to allow angular adjustment of bearings 58 to obtain the desired angle between rollers 48. In this manner a simple and effective means is provided for driving rollers 48 at an angle to each other and from the same straight shaft 50 without unduly weakening the structure. By mounting the rollers of each of the sets 47 and 48 at an angle to each other, the tractive force exerted by them on sheet 26 is more effective. Also, since each roller rotates about an axis which is substantially perpendicular to the edge on which it rolls, the joint formed by the edges when they are welded together will be more accurately formed and the cross section of the pipe will be more nearly circular.

In addition to shaping the pipe as it passes through the machine, rollers 46, 47 and 48 also serve to drive the pipe through the machine. For driving the rollers, an electric motor 62 is shown having a gear 63 mounted on its shaft. Gear 63 meshes with a gear 64 mounted on shaft 65 to drive sprocket 66 which is also mounted on shaft 65. Chain 67 connects sprocket 66 with sprocket 51 mounted on shaft 50 of rollers 48. Shaft 50 has mounted thereon a sprocket 68 (Fig. 3) meshing with chain 70 for driving sprocket 71 mounted on shaft 72 of rollers 47. Sprocket 73 mounted on shaft 72 meshes with chain 74 to drive sprocket 75 mounted on shaft 76 on which rollers 46 are mounted. For driving conveyor chain 85, gear 64 meshes with gear 79 mounted on shaft 78 to drive sprocket 80 which is also mounted on shaft 78. Sprocket 80 meshes with chain 81 to drive sprocket 82 mounted on shaft 83 on which is mounted another sprocket 84. Sprocket 84 meshes with chain 85 to drive sprocket 86. As shown in Fig. 1, chain 85 aids driving rollers 46, 47 and 48 in conveying the pipe through the machine and a projection 87 may be provided on the chain to grasp the pipe.

Chain 85 may be raised or lowered to accommodate any size pipe within the range of the machine. For this purpose, the bearings of shaft 83 are shown mounted on one end of arms 91 pivoted on shaft 78. Pivotally connected to arm 91 by pivot 93, are downwardly extending members 92 having at their other ends rollers 94. Rollers 94 are mounted on a shaft 95 which passes through a hole in an angle section 96. Angle section 96 is provided with a longitudinal slot and is capable of adjustment, being locked in adjusted position by means of a bolt 97. To lower chain 85, bolt 97 is loosened and shaft 95 is pulled to the left as viewed in Fig. 1, as will be more fully described hereinafter.

Sprocket 86 is journalled in cross heads 101, supported for sliding movement in guides 102 and 103 mounted on bracket 104 which is secured to support 105 by means of bolts 106 and 107. Screws 108 engaging threads in the end of guides 102 and 103 and abutting against cross heads 101, enable adjustment of the tension of chain 85. Bolts 106 and 107 pass through slots in support 105 and are thereby capable of adjustment vertically.

To lower chain 85, screws 108 are turned to loosen the tension on chain 85 and bolts 106 and 107 are loosened and moved down to the desired position in which they are again tightened. This lowers sprocket 86 and sprocket 84 may be lowered by pulling shaft 95 by means of angle section 96 to the left as viewed in Fig. 1. Arms 91 are thereby caused to rotate about shaft 78, carrying with them the bearings on which shaft 83 of sprocket 84 is mounted. Bolt 97 is then tightened to prevent translational movement of shaft 95 and screws 108 are turned to secure the proper tension on chain 85. In this manner the machine may be adjusted to accommodate pipes of different diameters and column 13 is shown with a cut out portion 109 so that this column will not interfere with pipes having large diameters. The other columns may be provided with similar cut out portions. It is to be understood, of course, that the machine is not limited to any specific dimensions and a machine may be built to provide for the welding of any size pipe.

For adjusting the machine to accommodate pipe made of sheet metal of different thicknesses, the fin 30 is vertically adjustable. As fin 30 is raised and lowered, it carries with it internal rollers 34 to 38, thereby changing the distance between these internal rollers and the external rollers of the machine. Fin 30 is shown supported on yoke-like members 31 and 32 having threaded extensions 113 and 114. Openings 111 and 112 are shown in fin 30, and in each of these openings a collar 116 is mounted, having threaded engagement with the threaded extensions 113 and 114 of yokes 31 and 32. A lever 117 having a ratchet connection with collar 116 is employed for turning the collar to raise or lower yokes 31 and 32 and to thereby raise or lower fin 30. At their lower ends, collars 116 rest upon members 118 mounted upon the framework of the machine. In addition to adjusting the rollers for the thickness of sheet 26, raising and lowering of fin 30 also varies the pressure between the rollers.

A plurality of roller dies 121 and 122 of novel construction are employed to give the pipe a true circular cross section and to roll edges 27 and 28 of sheet 26 closer together. One of these roller dies is shown in detail in Fig. 6. Each roller die comprises a plurality of links 123, each link having mounted therein a roller 124 having concave rolling surfaces. Sheet 26 is adapted to pass through the roller dies and rollers 124 are therefore mounted for rotation about axes which are substantially parallel to tangents of the surface of the sheet as it passes through. The roller dies are suspended from fin 30 by means of brackets 126 and 127 secured to the fin. Pivoted to brackets 126 and 127 are lever members 128 and 129, respectively. Each of the lever members 128 and 129 is provided with a slot 130 at its other end for engaging a projection 131 on the half-link 125 of the roller die. Each lever member comprises two legs and between legs 132 and 133 of lever member 128 is mounted a block 134 having a hole therein tapped with a left-hand thread. A similar block 135 having a right-hand thread is mounted between the legs of lever member 129 and a screw 136 having left-hand and right-hand threads makes threaded engagement with blocks 134 and 135. Mounted on one end of screw 136 is a hand lever 139 secured in place by nuts 137 and 138 for turning screw 136 to thereby actuate lever members 128 and 129. When screw 136 is turned in one direction, the ends of lever members 128 and 129 are brought closer together to increase the pressure exerted by the roller die on sheet 26 and when screw 136 is turned in the opposite direction, the pressure exerted by the roller die is decreased. The length of each of the links 123 is preferably approximately 3.14 inches, so the addition of one link will increase the diameter of the roller die one inch and the removal of one link will decrease the diameter one inch. Half-links 141 and 142 are provided so that one-half of a link may be added or detracted from each side of the supporting member 143. For example, by replacing half-link 141 with a full link and half-link 142 with another full link, the diameter is increased one inch. To decrease the diameter by one inch, links 141 and 142 are removed without substituting any other links. Holes 144 are provided in supporting member 143 approximately the distance of one-quarter of a link from the holes shown occupied by half-link 141 and other holes 145 are provided bearing a similar relation to the holes shown occupied by half-link 142. By using holes 144 and 145 to secure the links to supporting member 143, the roller die may be adjusted to provide for variations of one-half inch in the diameter of the pipe. The finer adjustments are made by turning screw 136.

Rollers 147 and 148, having convex rolling surfaces and mounted internally of the pipe on brackets 149 and 150 secured to fin 30 are employed to shape the abutting edges of sheet 26 as it passes through the roller die. It will be apparent that the tighter the roller die is clamped about the sheet, the greater will be the pressure upon rollers 147 and 148. In a roller die of this construction, the radial pressure against all points of the sheet is approximately the same and under these conditions it is the natural tendency of the sheet to take a true circular outline. When mainly bending forces, rather than compressional forces, are applied to shape the pipe, the pipe has a tendency to assume a shape other than circular. This tendency of the pipe to assume a shape other than circular accounts for the necessity of bending the edges of a sheet before it is bent into a pipe when bending forces, as distinguished from radial compressional forces, are employed.

Supporting member 143 has journalled therein a roller 152 for supporting conveyor chain 85 as it passes between supporting member 143 and sheet 26. The supporting members 143 associated with the several roller dies may be connected together by a spacing rod 153 for maintaining the roller dies in spaced relation.

When sheet 26 is started through the machine, a cable 156 is wrapped around it to hold its edges together, see Fig. 5 of the drawings. One end 157 of the cable is anchored to a clamping member 158 and the other end 159 passes through split jaws 161 in clamping member 158. A cam 162 having an operating lever 163 is employed to clamp the jaw members together. Clamp 158 is supported for sliding movement on guides 164 and 165 supported by brackets 167 and 168 secured to fin 30. An opening 169 is cut out of fin 30 to provide a space to allow the sliding movement of clamping member 158. Cable 156 preferably embraces chain 85 and as sheet 26 is moved along by chain 85, cable 156 and clamping member 158 move with the sheet. After sheet 26 has moved a sufficient distance to be grasped by rollers 48 and 37, clamp 158 has moved to a position in which operating member 163 of cam 162 strikes a projection 171, see Fig. 1 of the drawings to release the clamp and free the cable. Sheet 26 is then held by rollers 37 and 48 and from this point on is carried through the machine by the driving action of these rollers and the other driving rollers of the machine.

To support pipe 29 as it leaves the machine and to relieve the pressure on rollers 34 and 35 a cantilever guide member 176 fulcrumed on shaft 83 is provided. Journalled at 181 in one end of guide member 176 is a roller 177 and a roller 179 on a shaft 182 is journalled at the other end of guide member 176. A roller 178 also may be provided to support part of the load carried by roller 179. Guide member 176 acts as a lever, the long arm of the lever being the distance between shaft 181 and shaft 83 and the short arm of the lever being the distance between shaft 182 and shaft 83. A piece of pipe supported by guide member 176, at all times therefore, tends to rotate guide member 176 counterclockwise about its fulcrum 83. The downward force exerted by pipe 29 on roller 177 tends to force roller 179 upwardly against the bottom of the pipe. The upward force exerted by roller 179 urges the pipe against external roller 46 and thereby relieves the pressure on internal rollers 34 and 35. By this construction, the weight of the pipe has no tendency to bend or weaken the part of fin 30 which supports rollers 34 and 35. To prevent rotational movement of guide member 176 after the pipe leaves roller 46, a projection 183 may be provided on guide member 176, this projection abutting against any suitable rigid element secured to the framework to prevent upward movement of the right-hand end of guide member 176.

A reel of filler rod 186, which may be mounted on the frame of the machine, supplies the welding electrode 187. For purposes of illustration, the carbon arc method of welding has been shown, the usual electrical connections being omitted from the drawings. Filler rod 186, as it is unreeled, passes beneath a roller 188 which wedges the filler rod into the opening between the abutting edges of sheet 26. Carbon electrode 187 is preferably made adjustable longitudinally of the opening, so that the most advantageous welding angle may be obtained. The most effective welding angle may be further assured by varying the pressure exerted by roller die 121. The welding angle of the apparatus in this manner may be very accurately determined and after it has once been adjusted, it will remain constant throughout the whole length of pipe. The roller 188 for forcing the filler rod into the opening may also be adjustable in order to position the filler rod in the most advantageous position.

The welding of the pipe is a continuous operation and the forces set up by the expansion and contraction of the heated parts can be employed to draw the edges together and make the joint even more nearly perfect. Thus, the very same forces which were detrimental in previous methods are in my method made to do useful work.

When the metallic arc process of welding is employed in my method, the same advantages are obtained and furthermore, the accurate control over the welding angle makes the metallic arc process especially well suited for the welding operation. Also, since the rate of feeding of the filler rod can be made proportional to the rate at which the pipe is drawn through the machine, whether the rate be constant or otherwise, the joint obtained will be absolutely uniform in either the metallic arc or the carbon arc process.

In the operation of the machine adjustments are first made to chain 85 and fin 30 to accommodate the particular size of pipe desired and a sheet of metal is then formed roughly into the general outline of a pipe and placed on the conveyor chain 85. The abutting edges of the sheet are placed upward to allow the sheet to pass around the internal rollers on fin 30. Cable 156 is then firmly wrapped about the sheet and clamped in position. When conveyor chain 85 is set in motion, the sheet is drawn along with it and when the first part of the sheet enters between rollers 37 and 48, rollers 48 begin to drive the pipe through the machine. Subsequently, handle 163 strikes projection 171, thereby releasing cable 156. Rollers 37 and 48, in addition to driving the pipe forwardly, at the same time gradually draw the edges together and shape the edges. When the sheet enters roller die 122, the edges are more closely drawn together, and the circular outline of the pipe is improved still further. After passing through roller die 122, the pipe passes between rollers 36 and 47 where the edges of the sheet are further shaped and pressed together, and after leaving rollers 36 and 47 the pipe enters roller die 121. When the pipe begins to emerge from roller die 121, the machine may be stopped if desired, to start the filler rod in the opening between the edges of the sheet and to make the finer adjustments of roller die 121 and electrode 187 for the purpose of obtaining the correct welding angle for the pipe. The sheet then passes through the welding arc and after the joint has been welded it passes between rollers 35 and 46 to roll the welded joint. Roller 46 is a driving roller and in this connection it might be pointed out that as the load becomes greater, the number of driving rollers increases. Thus, as the sheet passes through the successive stages, more driving rollers are encountered to insure ample driving force at all times. The main part of the work is done by the rollers, chain 85 being used more for a support and for starting the sheet on its way than for driving the sheet through the machine. Under some conditions, it might be advisable to substitute some other support for the sheet and to start it manually, rather than employing a chain for the purpose.

When the pipe reaches roller 177, guide member 176 operates as hereinbefore described, to push pipe 29 upwardly against roller 46, relieving the pressure on rollers 34 and 35.

While I have described a specific embodiment of my invention, I do not wish to be limited thereto, as many other embodiments coming within the scope of the appended claims will be apparent to those skilled in the art.

I claim:

1. In a machine for forming pipe, a cable adapted to be wrapped about a sheet of metal, means for clamping said cable about said sheet, means for conveying said sheet through the machine and means for automatically releasing said cable after said sheet has been conveyed a predetermined distance.

2. In a machine for forming pipe, a pair of rollers for rolling the adjacent edges of a sheet of metal of approximately cylindrical form having a longitudinal slit, the rollers of said pair being mounted at an angle to each other, each of said rollers being mounted on a hollow shaft, a straight shaft passing through the hollow shafts of both of said rollers, and means for driving said straight shaft to impart rotational movement to said rollers.

3. In a machine for forming pipe, a roller die for drawing together the edges of a cylindrical sheet of metal having a longitudinal slit, said roller die comprising a plurality of links, each of said links having journalled therein a roller, the axis of rotation of each of said rollers being approximately parallel to a tangent of the surface of said sheet.

4. In a machine for forming pipe, a roller die for shaping a sheet of metal, said roller die comprising a plurality of links, each of said links having journalled therein a roller, certain ones of said links being approximately 3.14 inches long.

5. In a machine for forming pipe, a roller die for shaping a sheet of metal, said roller die comprising a plurality of links, each of said links having journalled therein a roller, certain ones of said links being approximately 3.14 inches long, and other of said links being approximately one half the length of said first mentioned links.

6. In a machine for forming pipe, means for conveying a sheet of metal through the machine, shaping rollers for rolling said sheet, a guide member comprising a roller journalled on each end of a lever, the weight of said sheet on one of said rollers causing the other roller to exert a force upon said sheet in a direction which relieves the pressure on certain ones of said shaping rollers.

7. In a machine for forming pipe, a roller die for drawing together the edges of a cylindrical sheet of metal having a longitudinal slit, said roller die comprising a plurality of links, each of said links having journalled therein a roller, the rollers on said links serving to roll the external surface of said sheet during longitudinal movement of the sheet through the die.

BRUNO W. HENNING.